Patented Nov. 29, 1927.

1,650,782

UNITED STATES PATENT OFFICE.

JAMES W. WEIR, OF FILLMORE, CALIFORNIA, AND WILLIAM J. RYAN, JR., OF SEATTLE, WASHINGTON.

METHOD OF TREATING LUBRICATING-OIL STOCKS.

No Drawing.   Application filed March 3, 1926.   Serial No. 92,039½.

This invention relates to the step in the manufacture of lubricating oils of removing the salts or reaction products from a sulphuric acid treated oil after neutralizing with an alkaline substance such as sodium hydroxide, lime, soda ash or other substances of an alkaline nature.

In the treatment of lubricating distillates for the manufacture of lubricating oils, in the step of neutralizing the acid remaining in the oil after the sulphuric acid treatment with alkaline substances, salts or soaps are formed which combine with the oil in a state of emulsion and are very difficult to remove.

We have discovered that these salts or soaps may be removed by treating the oil with colloidal clay in a finely divided state under heat, and that they may be most readily removed when only sufficient alkaline substance is applied in the neutralizing step to neutralize the acid present without a substantial excess of alkaline substance. When the alkaline substance is applied in proper quantity and not in excess of the quantity necessary to neutralize the acid bodies present, substantially no sedimentation takes place in its application. The reaction products between the alkaline substance and the acids present remain in suspension in the oil under treatment in the form of an emulsion.

We have discovered that in the step of neutralizing the acid bodies in the oil in this manner to cause the salts or soaps to emulsify with the oil under treatment, causing the salts or soaps to be formed in this manner forms them into compounds which may be readily extracted with colloidal clays in a finely divided state.

Our discovery resides in the peculiar method of creating and forming a salt or soap that may be readily extracted by treatment with finely divided colloidal clay. While we do not confine ourselves strictly thereto, the following is a preferred method of procedure in the carrying out of our process:

Lubricating oil stock is treated with sulphuric acid by any of the methods well known in the art, after which the sludge formed in the acid treatment is drawn off or removed. The sludge-free oil is then treated preferably with a strong solution of caustic soda, sufficient only to neutralize the acid bodies present without a substantial excess of the alkaline substance used. The quantity of caustic soda used will naturally vary in direct ratio to the acid content of the oil under treatment, and the proper amount must be predetermined by the well known methods employed in the art of titrating the oil. When the proper amount of caustic soda solution is applied, substantially no sedimentation will occur. The caustic soda solution, after combining with the acid bodies in the oil, will form an emulsion and remain suspended in the oil under treatment. This step is particularly important, and the reaction thus accomplished forms bodies in the oil which may be readily removed by treatment with colloidal clay in a finely divided state, preferably of a fineness whereby 90% will pass through a 200-mesh screen.

Heretofore the soaps formed in the neutralizing of acid bodies in oil have been removed by washing with water, alcohol or other solvents. In our process we add and agitate with the oil containing the salts or soaps in an emulsified state, finely divided colloidal clay in sufficient quantity to remove the salts or soaps. This quantity will vary in direct ratio to the quantity of salts or soaps to be removed. Generally clay in proportions of 5,000 gallons of oil to one ton of clay will be sufficient, and in some cases a very much smaller quantity of clay may be used.

While the oil and clay are maintained in intimate admixture in any suitable mixing or agitating apparatus, the oil is heated by any suitable means to a proper temperature wherein the salts or soaps may be removed by the clay adsorption with any well known filtering apparatus or filter press. The temperature required is usually approximately 300° F., always above 212° F., and in some cases where the air is excluded much higher temperatures may be used, even up to temperatures just below the boiling point of the oil under treatment. In certain cases pressure may be found necessary while the oil is under heat to prevent foaming and for the removal of vapors evolved by the heat applied.

Finely divided adsorbent material as herein used is meant to include all substances having adsorptive properties, such as fuller's earth, colloidal clay, bauxite, montmorillonite, pyrophyllite, diatomaceous earth, bone black, silica-gel and all such substances. The adsorbent material may or may not have decolorizing properties; indeed, many colloidal clays found in California have adsorbent properties sufficient to remove soaps but substantially no decolorizing properties.

It is to be distinctly understood that this is not a decolorizing method; in fact, the salts or soaps herein removed destroy the decolorizing properties of adsorbent materials. However, the removal of the salts or soaps in this manner tends to stabilize the color obtained by the acid treatment.

The word "soaps" as herein used is meant to include the reaction products formed in neutralizing acid bodies with an alkaline substance, as the term is commonly used in the art of treating lubricating oils.

We claim:

In the manufacture of lubricating oil, the method of extracting emulsified soaps formed in neutralizing the acid bodies remaining in the oil stock after a treatment with sulphuric acid which consists in treating a substantially sludge-free sulphuric acid-treated lubricating oil stock with an alkaline solution, with substantially no excess solution above the quantity necessary to neutralize the acid bodies present, forming an emulsion with substantially no sedimentation, adding and intermingling therewith a finely divided adsorbent material at a temperature above 212° F., and removing from the mixture the adsorbent material and adsorbed soaps by filtration.

Signed at Fillmore, in the county of Ventura, State of California, this 17th day of February, 1926.

JAMES W. WEIR.
WILLIAM J. RYAN, Jr.